(12) United States Patent
Chen et al.

(10) Patent No.: US 8,936,399 B2
(45) Date of Patent: Jan. 20, 2015

(54) RECEPTACLE-TYPE BI-DIRECTIONAL OPTICAL MODULE AND ELECTRONIC APPARATUS THEREOF

(75) Inventors: Wen-Tzung Chen, New Taipei (TW); Chih-Hsien Chang, New Taipei (TW)

(73) Assignee: Axcen Photonics Corp., New Taipei (TW)

(*) Notice: Subject to any disclaimer, the term of this patent is extended or adjusted under 35 U.S.C. 154(b) by 342 days.

(21) Appl. No.: 13/026,028

(22) Filed: Feb. 11, 2011

(65) Prior Publication Data

US 2012/0148185 A1 Jun. 14, 2012

(30) Foreign Application Priority Data

Dec. 13, 2010 (TW) .............................. 99224122 U

(51) Int. Cl.
  *G02B 6/36* (2006.01)
  *G02B 6/42* (2006.01)
(52) U.S. Cl.
  CPC ............ *G02B 6/4246* (2013.01); *G02B 6/4263* (2013.01); *G02B 6/4281* (2013.01); *G02B 6/4292* (2013.01)
  USPC ..................... 385/53; 385/88; 385/15; 385/14
(58) Field of Classification Search
  CPC ... G02B 6/4246; G02B 6/4292; G02B 6/4236
  USPC ......................... 385/14, 15, 31, 53, 88, 92, 58
  See application file for complete search history.

(56) References Cited

U.S. PATENT DOCUMENTS

| | | | | |
|---|---|---|---|---|
| 7,504,668 B2 * | 3/2009 | Wang et al. | ...................... | 257/98 |
| 2005/0141821 A1 * | 6/2005 | Loch et al. | ...................... | 385/88 |
| 2007/0230863 A1 * | 10/2007 | Fukuda et al. | .................. | 385/14 |
| 2007/0230878 A1 * | 10/2007 | Nakazawa et al. | .............. | 385/92 |
| 2007/0286558 A1 * | 12/2007 | Loch et al. | ...................... | 385/92 |
| 2008/0031574 A1 * | 2/2008 | Tanaka | ............................ | 385/88 |
| 2010/0158535 A1 * | 6/2010 | Chou | ............................. | 398/135 |

* cited by examiner

*Primary Examiner* — Mark Robinson
*Assistant Examiner* — Mary El Shammaa
(74) *Attorney, Agent, or Firm* — Michael A. Glenn; Perkins Coie LLP

(57) ABSTRACT

A receptacle-type bi-directional optical module includes an optical connector, a bi-directional optical sub-assembly (BOSA), and a flexible printed circuit board. The bi-directional optical sub-assembly is detachably coupled to the optical connector. The bi-directional optical sub-assembly includes a transmitter end and a receiver end. The flexible printed circuit board includes a board body, a first connection part, and a second connection part. A first end of the board body is electrically connected to a printed circuit board. The first connection part is connected to a second end of the board body for electrically connecting to the transmitter end. The second connection part is connected to the edge of the first connection part for electrically connecting to the receiver end.

7 Claims, 5 Drawing Sheets

RECEPTACLE-TYPE BI-DIRECTIONAL OPTICAL MODULE AND ELECTRONIC APPARATUS THEREOF

RELATED APPLICATIONS

This application claims priority to Taiwan Application Serial Number 99224122, filed Dec. 13, 2010, which is herein incorporated by reference.

BACKGROUND

1. Field of Invention

The present invention relates to a receptacle-type bi-directional optical module.

2. Description of Related Art

Optical sub-assemblies (OSA) in an optical communication system can be classified as transmitter optical sub-assemblies (TOSA) or receiver optical sub-assemblies (ROSA) according to devices with different functions. The transmitter optical sub-assemblies are capable of optically coupling laser diodes or light emitting diodes to an optical fiber, such that electrical signals can be transformed to light signals and be focused by lens to be transmitted in the optical fiber. On the contrary, the receiver optical sub-assemblies are capable of optically coupling the light signals in the optical fiber to pin diodes or avalanche photodetector (APD) by being focused with lens, so as to transform the light signals to electrical signals. A so-called bi-directional optical sub-assembly (BOSA) integrates a transmitter optical sub-assembly and a receiver optical sub-assembly in a single sub-assembly and executes functions of transmitting and receiving with a single optical fiber.

Optical fibers that can be used for transmitting light are made of glass fibers or plastics fibers. The diameter of an optical fiber is only about 10 um, which is just a bit thicker than a hair. By being encapsulated into the plastic cladding, the optical fiber can be bent without breaking. Compared with the conventional cable, the optical fiber have advantages such as high bandwidth, large communication capacity, less decay, far transmitting distance, small crosstalk, high transmission quality, resistance to electromagnet interference, high secrecy, small size, lightness, ease of laying and removing, abundant information, etc. Therefore, the optical fiber is good enough to substitute for the conventional cable to be the medium for communication transmission.

Although there are many advantages and characteristics, the optical fiber has some disadvantages. Please refer to FIG. 5. FIG. 5 is a stereoscopic view showing that a conventional pigtail-type BOSA 42 connects to an optical connector 40 through an optical fiber 44. The pigtail-type BOSA 42 is easy to be damaged during manufacturing processes. Besides, the optical fiber 44 must be orderly entwined when the pigtail-type BOSA 42 is disposed on the circuit board, as shown in FIG. 5. But, the terminal processing of the optical fiber 44 is hard to be handled, operations of splitting and coupling are complicated, and etc. Especially, the optical fiber 44 is brittle and has low mechanical strength, so the bending radius of the optical fiber 44 is not proper to be too small. Moreover, if the pigtail-type BOSA 42 is directly welded on the circuit board, the heat dispersing performance will becomes worse.

SUMMARY

In order to solve the problems of prior arts, a receptacle-type bi-directional optical module according to an embodiment of the invention is provided. The bi-directional optical sub-assembly and the optical connector of the receptacle-type bi-directional optical module of the invention are optically coupled by the approach of directly plugging, so the connection approach of connecting the conventional pigtail-type BOSA to the optical connector through an optical fiber can be replaced. Therefore, the problems that the pigtail-type BOSA is easy to be damaged during manufacturing processes and the terminal processing of the optical fiber is hard to be handled can be solved. Moreover, an integrally formed flexible printed circuit board provided by the invention is capable of directly coupling the bi-directional optical sub-assembly to the optical connector and directly mounting the bi-directional optical sub-assembly on the panel of the casing. That is to say, the bi-directional optical sub-assembly is not necessarily mounted on the circuit board, so that the cost of the optical fiber can be saved and the heat dispersing performance of the bi-directional optical sub-assembly can be improved. Besides, the flexible printed circuit board can increase the flexibility of the electrical connection between the bi-directional optical sub-assembly and the circuit board, and thus the productivity of the products can be improved.

According to an embodiment of the invention, the receptacle-type bi-directional optical module is mainly used to electrically connecting to a circuit board. The receptacle-type bi-directional optical module includes an optical connector, a bi-directional optical sub-assembly, and a flexible printed circuit board. The bi-directional optical sub-assembly is detachably coupled to the optical connector. The bi-directional optical sub-assembly includes a transmitter end and a receiver end. The flexible printed circuit board includes a board body, a first connection part, and a second connection part. A first end of the board body is electrically connected to the circuit board. The first connection part is connected to a second end of the board body for electrically connecting to the transmitter end. The second connection part is connected to the edge of the first connection part for electrically connecting to the receiver end.

According to another embodiment of the invention, an electronic apparatus is provided. The electronic apparatus mainly includes a casing, an optical connector, a bi-directional optical sub-assembly, a flexible printed circuit board, and circuit board. The casing includes a panel. The optical connector is disposed on the panel. The bi-directional optical sub-assembly is detachably coupled to the optical connector in the casing. The bi-directional optical sub-assembly includes a transmitter end and a receiver end. The flexible printed circuit board includes a board body, a first connection part, and a second connection part. The first connection part is connected to a second end of the board body for electrically connecting to the transmitter end. The second connection part is connected to the edge of the first connection part for electrically connecting to the receiver end. The circuit board is disposed in the casing and electrically connects to a first end of the board body.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
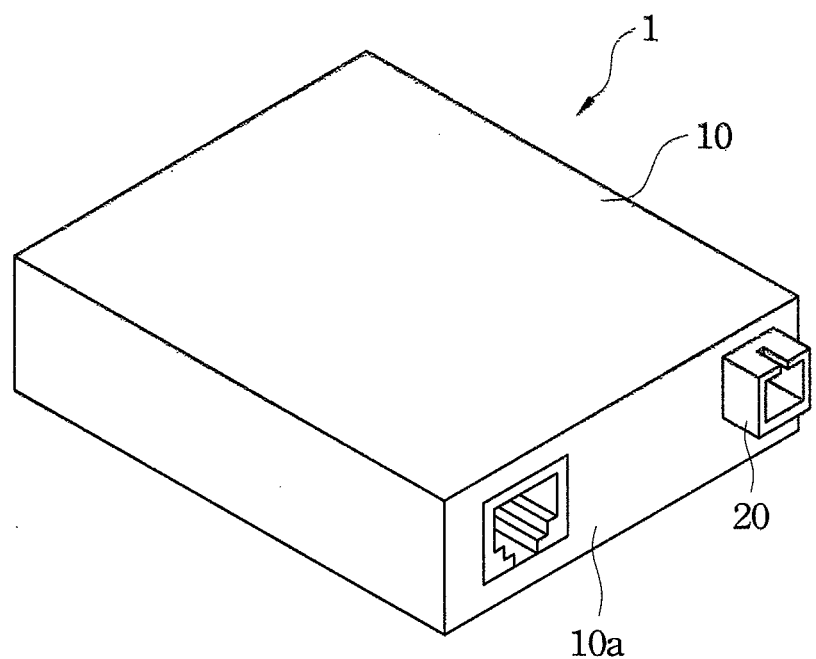
FIG. 1 is an exploded view showing an electronic apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

A receptacle-type bi-directional optical module according to an embodiment of the invention is provided. Specifically, the bi-directional optical sub-assembly and the optical connector of the receptacle-type bi-directional optical module of the invention are optically coupled by the approach of directly plugging, so the connection approach of connecting the conventional pigtail-type BOSA to the optical connector through an optical fiber can be replaced. Therefore, the problems that the pigtail-type BOSA is easy to be damaged during manufacturing processes and the terminal processing of the optical fiber is hard to be handled can be solved. Moreover, an integrally formed flexible printed circuit board provided by the invention is capable of directly coupling the bi-directional optical sub-assembly to the optical connector and directly mounting the bi-directional optical sub-assembly on the panel of the casing. That is to say, the bi-directional optical sub-assembly is not necessarily mounted on the circuit board, so that the cost of the optical fiber can be saved and the heat dispersing performance of the bi-directional optical sub-assembly can be improved. Besides, the flexible printed circuit board can increase the flexibility of the electrical connection between the bi-directional optical sub-assembly and the circuit board, and thus the productivity of the products can be improved.

Please refer to FIG. 1. FIG. 1 is an exploded view showing an electronic apparatus 1 according to an embodiment of the invention.

As shown in FIG. 1, the electronic apparatus 1 of the embodiment includes a casing 10, and the casing 10 includes a panel 10a. The electronic apparatus 1 of the embodiment can be, but not limited to, an Optical Network Unit (ONU), an Optical Line Terminal (OLT), an exchange, or a media converter. Electronic apparatuses that adopt bi-directional optical sub-assemblies can apply the concepts of the electronic apparatus 1 disclosed by the invention to make improvements.

Figure 2A:
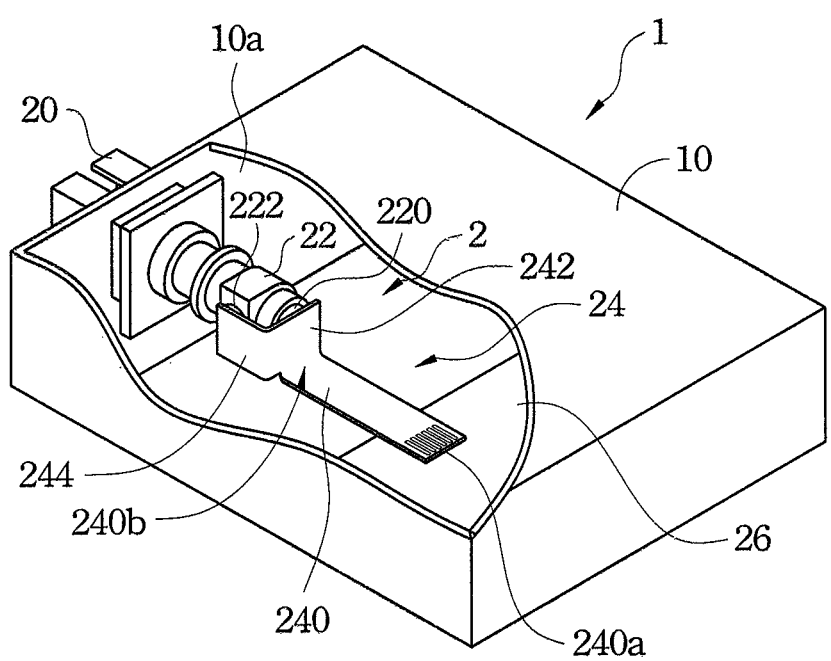
FIG. 2A is a stereoscopic view showing the receptacle-type bi-directional optical module in the electronic apparatus in FIG. 1.

Please refer to FIG. 2A. FIG. 2A is a stereoscopic view showing the receptacle-type bi-directional optical module 2 in the electronic apparatus 1 in FIG. 1.

As shown in FIG. 2A, the electronic apparatus 1 of the embodiment further includes an optical connector 20, a bi-directional optical sub-assembly 22, a flexible printed circuit board 24, and a circuit board 26. The optical connector 20 is disposed on the panel 10a. The bi-directional optical sub-assembly 22 is detachably coupled to the optical connector 20 in the casing 10. In other words, the bi-directional optical sub-assembly 22 is capable of directly coupling to the optical connector 20 and directly mounting on the panel 10a of the casing 10. The bi-directional optical sub-assembly 22 includes a transmitter end 220 and a receiver end 222. The flexible printed circuit board 24 includes a board body 240, a first connection part 242, and a second connection part 244. The first connection part 242 is connected to a second end 240b of the board body 240 for electrically connecting to the transmitter end 220. The second connection part 244 connected to the edge of the first connection part 242 for electrically connecting to the receiver end 222. The circuit board 26 is disposed in the casing 10 and electrically connects to a first end 240a of the board body 240. Therefore, owing to the flexibility of the flexible printed circuit board 24, the first connection part 242 that connects to the second end 240b of the board body 240 can be bended relative to the board body 240 to be mounted electrically connected to the transmitter end 220 of the bi-directional optical sub-assembly 22. Similarly, the second connection part 244 that connects to the edge of the first connection part 242 can be bended relative to the first connection part 242 to be mounted and electrically connected to the receiver end 222 of the bi-directional optical sub-assembly 22.

In the embodiment, the first end 240a of the foregoing board body 240 can be welded on the circuit board 26 by a welding process, so as to electrically connect the first end 240a of the board body 240 to the circuit board 26.

Figure 2B:
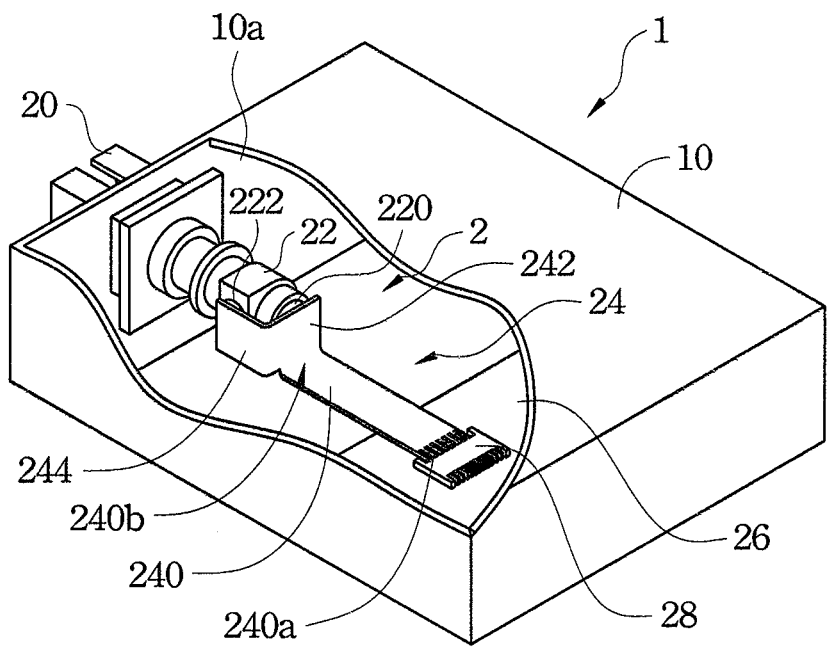
FIG. 2B is a stereoscopic view showing another embodiment of the receptacle-type bi-directional optical module in FIG. 2A.

Please refer to FIG. 2B. FIG. 2B is a stereoscopic view showing another embodiment of the receptacle-type bi-directional optical module 2 in FIG. 2A.

As shown in FIG. 2B, the electronic apparatus 1 of the embodiment can further include an electrical connector 28. The electrical connector 28 can be disposed on the circuit board 26 for electrically connecting to the first end 240a of the board body 240 of the flexible printed circuit board 24 and the circuit board 26 respectively. In other words, the electrical connector 28 can be the electrically connecting medium between the first end 240a of the board body 240 of the flexible printed circuit board 24 and the circuit board 26. The other components of the receptacle-type bi-directional optical module 2 of the embodiment are the same as those of the foregoing embodiment, so FIG. 2A and the above-mentioned related explanations can also be referred to without redundantly explaining.

Figure 2C:
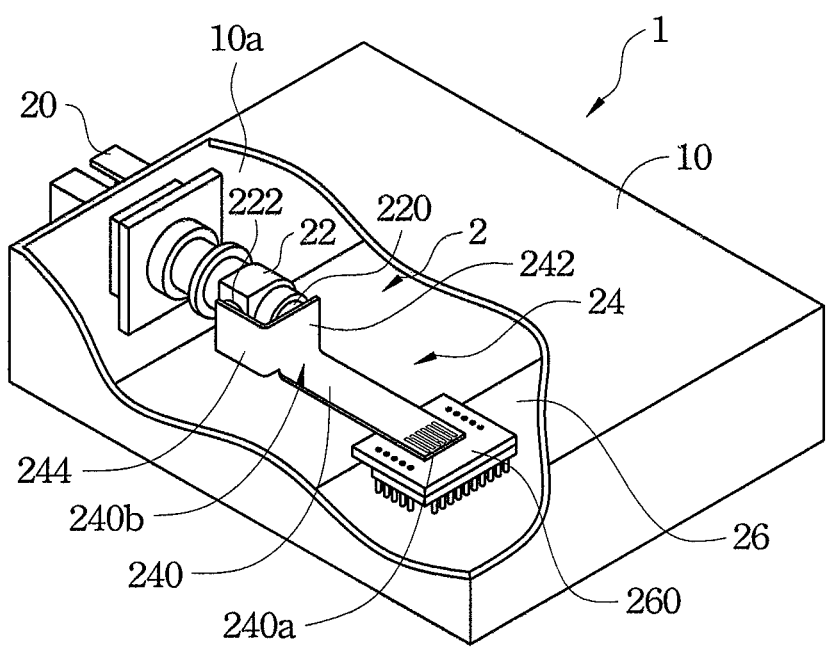
FIG. 2C is a stereoscopic view showing another embodiment of the receptacle-type bi-directional optical module in FIG. 2A.

Please refer to FIG. 2C. FIG. 2C is a stereoscopic view showing another embodiment of the receptacle-type bi-directional optical module 2 in FIG. 2A.

As shown in FIG. 2C, the circuit board 26 of the embodiment can further include a daughter board 260 for electrically connecting to the first end 240a of the board body 240 of the flexible printed circuit board 24. In other words, the daughter board 260 can be the electrically connecting medium between the first end 240a of the board body 240 of the flexible printed circuit board 24 and the circuit board 26. The other components of the receptacle-type bi-directional optical module 2 of the embodiment are the same as those of the foregoing embodiment, so FIG. 2A and the above-mentioned related explanations can also be referred to without redundantly explaining.

Figure 3A:
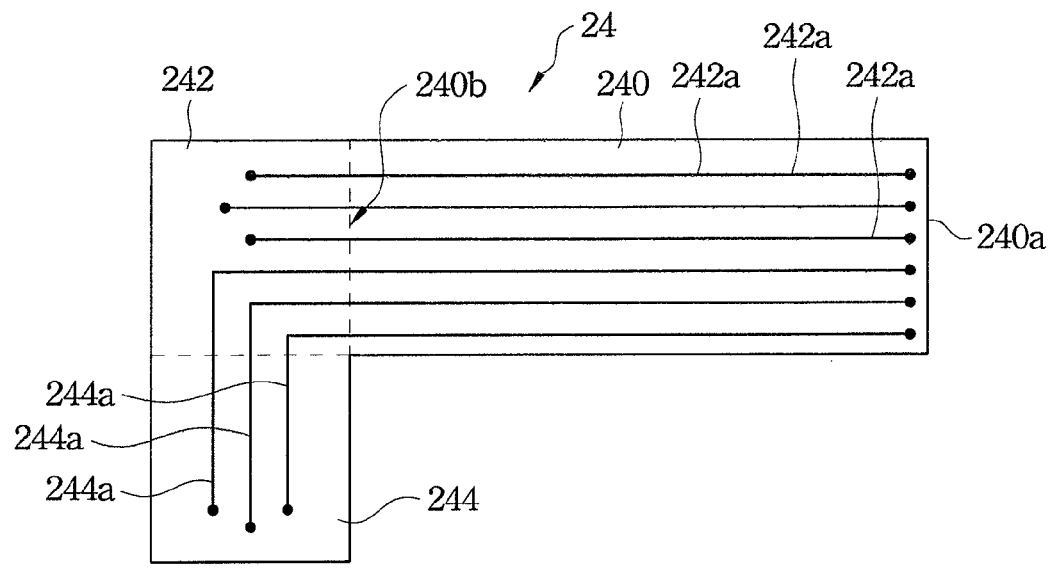
FIG. 3A is a top view showing the flexible printed circuit board of the receptacle-type bi-directional optical module in FIG. 2A.
Figure 3B:
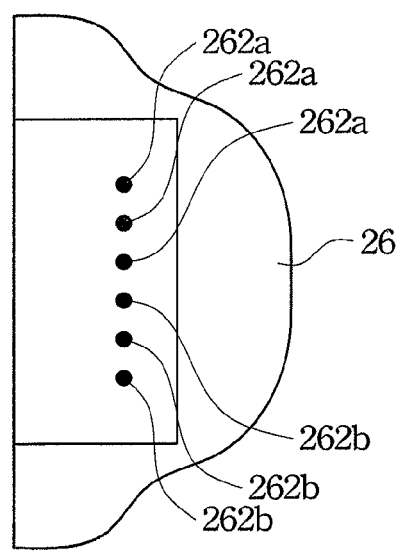
FIG. 3B is a top view showing the circuit board of the receptacle-type bi-directional optical module in FIG. 2A.

Please refer to FIG. 3A and FIG. 3B. FIG. 3A is a top view showing the flexible printed circuit board of the receptacle-type bi-directional optical module in FIG. 2A. FIG. 3B is a top view showing the circuit board of the receptacle-type bi-directional optical module in FIG. 2A.

As shown in FIG. 3A and FIG. 3B, in order to achieve the objectives of electrically connecting the transmitter end 220 of the bi-directional optical sub-assembly 22 to the circuit board 26 through the first connection part 242 and the board body 240 of the flexible printed circuit board 24 and electrically connecting the receiver end 222 of the bi-directional optical sub-assembly 22 to he circuit board 26 through the second connection part 244 and the board body 240 of the flexible printed circuit board 24, the foregoing flexible printed circuit board 24 can further include first circuits 242a and second circuits 244a. The first circuits 242a and the second circuits 244a are respectively disposed in the board body 240. The circuit board 26 can further include first junctions 262a corresponding to the first circuits 242a and second junctions 262b corresponding to the second circuits 244a. The first circuits 242a can be used for electrically connecting to the first connection part 242 and the first junctions 262a on the circuit board 26 respectively. The second circuits 244a can be used for electrically connecting to the second connection part 244 and the second junctions 262b on the circuit board 26 respectively. In other words, the first circuits 242a or the first junctions 262a will not electrically connect to the second circuit 244a or the second junctions 262b. Therefore, the transmitter end 220 of the bi-directional optical sub-assembly 22 can transmit signals with the circuit board 26 through the first connection part 242, the first circuits 242a, and the first junctions 262a. Similarly, the receiver end 222 of the bi-directional optical sub-assembly 22 can transmit signals with the circuit board 26 through the second connection part 244, the second circuits 244a, and the second junctions 262b.

Practically, the transmitter end 220 of the bi-directional optical sub-assembly 22 electrically connects to the end of the first circuits 242a that is located at the first connection part 242, and the receiver end 222 of the bi-directional optical sub-assembly 22 electrically connects to the end of the second circuits 244a that is located at the second connection part 244. That is to say, although the layout of the second circuits 244a is from the board body 240 to the second connection part 244 through the edge of the first connection part 242, the second circuits 244a that electrically connects to the receiver end 222 of the bi-directional optical sub-assembly 22 and the second junctions 262b of the circuit board 26 respectively does not electrically connect to the transmitter end 220 of the bi-directional optical sub-assembly 22.

Besides, the quantities of the first circuits 242a, the first junctions 262a, the second circuits 244a, and the second junctions 262b are not limited and can be elastically adjusted according to the requirements of designing or the limitations during manufacturing, as long as the quantity of the first circuits 242a is matched with that of the first junctions 262a and the quantity of the second circuits 244a is matched with that of the second junctions 262b.

Figure 4A:
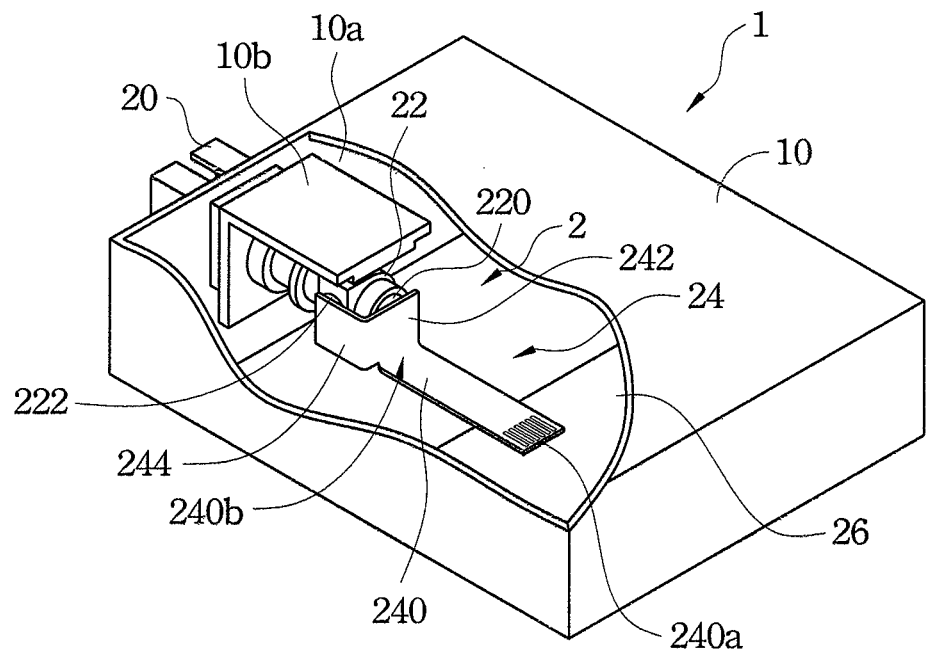
FIG. 4A is a stereoscopic view showing another embodiment of the receptacle-type bi-directional optical module in FIG. 2A.

Please refer to FIG. 4A. FIG. 4A is a stereoscopic view showing another embodiment of the receptacle-type bi-directional optical module 2 in FIG. 2A.

As shown in FIG. 4A, the casing 10 can further include a heat dissipating fin 10b. The thermal plate 10b is disposed on the panel 10a and extends to thermally connect the bi-directional optical sub-assembly 22. Therefore, the heat generated by the bi-directional optical sub-assembly 22 can be transmitted to the whole casing 10 through the panel 10a by the thermal plate 10b, so that the heat dispersing performance of the bi-directional optical sub-assembly can be improved. In another embodiment, the thermal plate 10b can also be replaced with a heat-dissipating fin.

Figure 4B:
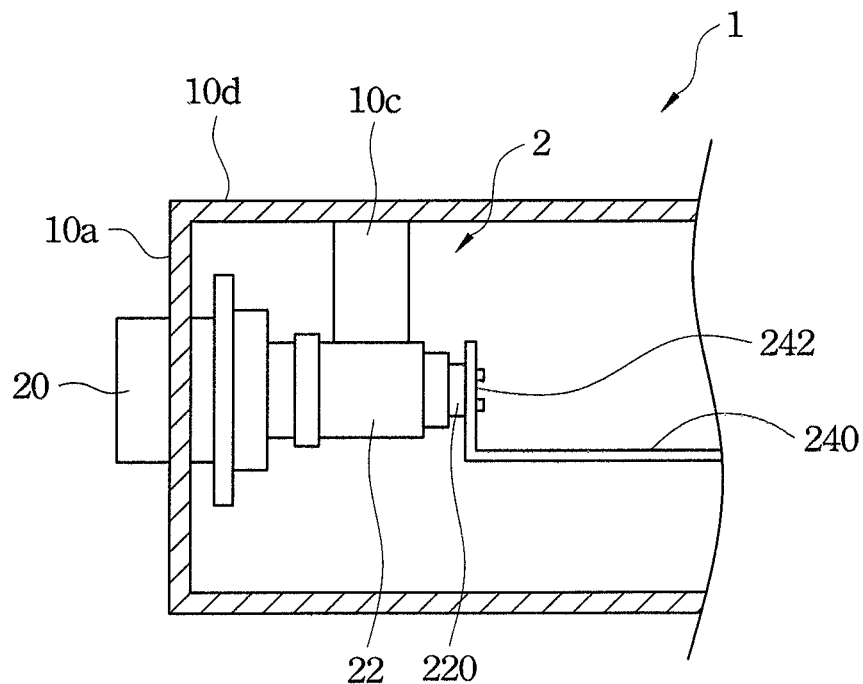
FIG. 4B is a side view showing another embodiment of the receptacle-type bi-directional optical module in FIG. 4A.
Figure 5:
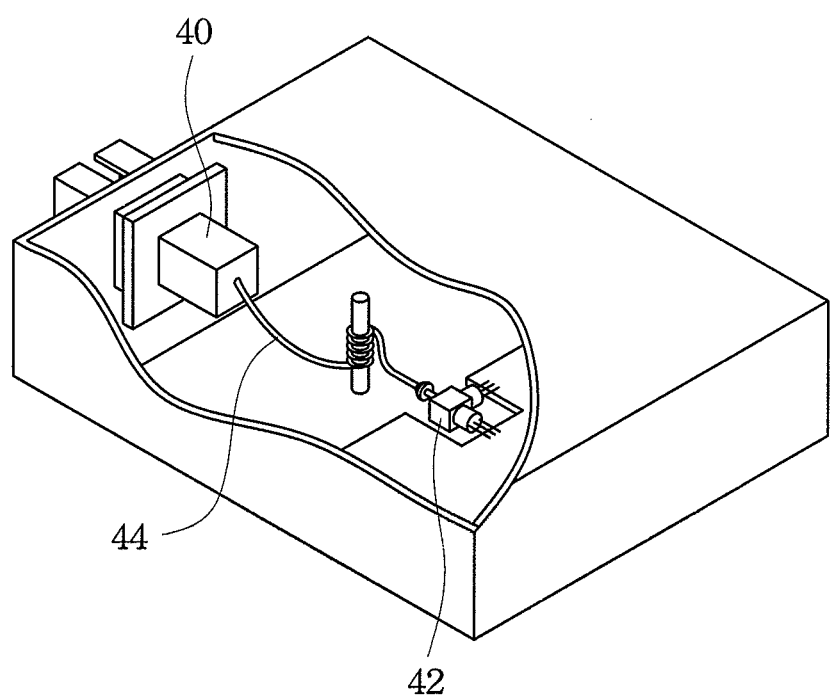
FIG. 5 is a stereoscopic view showing that a conventional pigtail-type BOSA connects to an optical connector through an optical fiber.

Please refer to FIG. 4B. FIG. 4B is a side view showing another embodiment of the receptacle-type bi-directional optical module 2 in FIG. 4A.

As shown in FIG. 4B, the casing 10 can further include a thermal plate 10c. The thermal plate 10c is disposed on the upper wall 10d of the casing 10 and extends to thermally connect the bi-directional optical sub-assembly 22. Therefore, the heat generated by the bi-directional optical sub-assembly 22 can be transmitted to the whole casing 10 through the upper wall 10d by the thermal plate 10c, so that the heat dispersing performance of the bi-directional optical sub-assembly can be improved. In another embodiment, the thermal plate 10c can also be replaced with a heat-dissipating fin.

According to the foregoing recitations of the embodiments of the invention, it is obvious that the receptacle-type bi-directional optical module and the electronic apparatus thereof of the invention mainly includes following advantages. The bi-directional optical sub-assembly and the optical connector of the receptacle-type bi-directional optical module of the invention are optically coupled by the approach of directly plugging, so the connection approach of connecting the conventional pigtail-type BOSA to the optical connector through an optical fiber can be replaced. Therefore, the problems that the pigtail-type BOSA is easy to be damaged during manufacturing processes and the terminal processing of the optical fiber is hard to be handled can be solved. Moreover, an integrally formed flexible printed circuit board provided by the invention is capable of directly coupling the bi-directional optical sub-assembly to the optical connector and directly mounting the bi-directional optical sub-assembly on the panel of the casing. That is to say, the bi-directional optical sub-assembly is not necessarily mounted on the circuit board, so that the cost of the optical fiber can be saved and the heat dispersing performance of the bi-directional optical sub-assembly can be improved. Besides, the flexible printed circuit board can increase the flexibility of the electrical connection between the bi-directional optical sub-assembly and the circuit board, and thus the productivity of the products can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A receptacle-type bi-directional optical module for electrically connecting to a first circuit board, the receptacle-type bi-directional optical module comprising:
    an optical connector;
    a bi-directional optical sub-assembly, detachably coupled to the optical connector, comprising a transmitter end and a receiver end; and
    a second circuit board that is flexible, the second circuit board comprising:
        a board body having a first end electrically connected to the first circuit board;

a first connection part, connected to a second end of the board body, the first connection part being bended relative to the board body to be directly mounted and electrically connected to the transmitter end; and a second connection part, connected to the edge of the first connection part, the second connection part being bended relative to the first connection part to be directly mounted and electrically connected to the receiver end, wherein the second circuit board further comprises at least one first circuit and at least one second circuit respectively disposed in the board body, the first circuit board further comprises at least one first junction corresponding to the first circuit and at least one second junction corresponding to the second circuit, the first circuit is used for electrically connecting to the first connection part and the first junction respectively, and the second circuit is used for electrically connecting to the second connection part and the second junction respectively.

2. The receptacle-type bi-directional optical module of claim 1, wherein the first end is welded to the first circuit board.

3. The receptacle-type bi-directional optical module of claim 1, further comprising an electrical connector, disposed on the first circuit board, for electrically connecting to the first end and the first circuit board respectively.

4. An electronic apparatus comprising:
a casing comprising a panel;
an optical connector, disposed on the panel;
a bi-directional optical sub-assembly, detachably coupled to the optical connector in the casing, comprising a transmitter end and a receiver end;
a flexible printed circuit board comprising:
a board body;
a first connection part, connected to a second end of the board body, the first connection part being bended relative to the board body to be directly mounted and electrically connected to the transmitter end; and
a second connection part, connected to the edge of the first connection part, the second connection part being bended relative to the first connection part to be directly mounted and electrically connected to the receiver end; and
a circuit board, disposed in the casing, electrically connecting to a first end of the board body, wherein the flexible printed circuit board further comprises at least one first circuit and at least one second circuit respectively disposed in the board body, the circuit board further comprises at least one first junction corresponding to the first circuit and at least one second junction corresponding to the second circuit, the first circuit is used for electrically connecting to the first connection part and the first junction respectively, and the second circuit is used for electrically connecting to the second connection part and the second junction respectively.

5. The electronic apparatus of claim 4, wherein the first end is welded to the circuit board.

6. The electronic apparatus of claim 4, further comprising an electrical connector, disposed on the circuit board, for electrically connecting to the first end and the circuit board respectively.

7. The electronic apparatus of claim 4, wherein the circuit board further comprises a daughter board for electrically connecting to the first end.

* * * * *